United States Patent
Lin et al.

(10) Patent No.: US 8,971,658 B2
(45) Date of Patent: Mar. 3, 2015

(54) EDGE CONTRAST ADJUSTMENT FILTER

(75) Inventors: Guo-Yau Lin, Fairport, NY (US); Jon McElvain, Manhattan Beach, CA (US)

(73) Assignee: Xerox Corporation, Norwalk, CT (US)

( * ) Notice: Subject to any disclaimer, the term of this patent is extended or adjusted under 35 U.S.C. 154(b) by 2444 days.

(21) Appl. No.: 11/789,051

(22) Filed: Apr. 23, 2007

(65) Prior Publication Data

US 2008/0260284 A1   Oct. 23, 2008

(51) Int. Cl.
*G06K 9/40*    (2006.01)
*H04N 1/58*    (2006.01)
*G06T 5/00*    (2006.01)

(52) U.S. Cl.
CPC ...... *H04N 1/58* (2013.01); *G06T 5/003* (2013.01); *G06T 2207/20192* (2013.01); *G06T 2207/10008* (2013.01); *G06T 2207/30176* (2013.01)
USPC .............. 382/266; 345/549; 345/77; 378/23; 378/65; 378/8; 382/103; 382/141; 382/190; 382/239; 382/275

(58) Field of Classification Search
None
See application file for complete search history.

(56) References Cited

U.S. PATENT DOCUMENTS

| | | | | |
|---|---|---|---|---|
| 5,297,037 A * | 3/1994 | Ifuku | ................................ | 378/8 |
| 5,424,754 A * | 6/1995 | Bar et al. | ...................... | 345/549 |
| 5,513,282 A * | 4/1996 | Williams | ...................... | 382/303 |
| 5,563,962 A * | 10/1996 | Peters et al. | .................. | 382/261 |
| 5,644,406 A * | 7/1997 | Harrington et al. | ........... | 382/239 |
| 5,687,303 A * | 11/1997 | Motamed et al. | ............ | 358/1.18 |
| 6,006,013 A * | 12/1999 | Rumph et al. | ............... | 358/1.15 |
| 6,081,577 A * | 6/2000 | Webber | ............................ | 378/23 |
| 6,144,461 A | 11/2000 | Crean et al. | | |
| 6,167,166 A | 12/2000 | Loce et al. | | |
| 6,178,011 B1 * | 1/2001 | Lin et al. | ......................... | 358/1.9 |
| 6,239,829 B1 * | 5/2001 | Curry | ............................. | 347/251 |
| 6,243,499 B1 | 6/2001 | Loce et al. | | |
| 6,256,104 B1 * | 7/2001 | Rumph et al. | ............... | 358/1.15 |
| 6,411,733 B1 * | 6/2002 | Saund | ........................... | 382/190 |
| 6,490,476 B1 * | 12/2002 | Townsend et al. | ........... | 600/427 |
| 6,516,046 B1 * | 2/2003 | Frohlich et al. | ................. | 378/65 |
| 6,704,123 B1 * | 3/2004 | Av-Shalom et al. | ......... | 358/2.99 |
| 6,798,920 B1 * | 9/2004 | Wells et al. | .................... | 382/275 |
| 7,397,890 B2 * | 7/2008 | Sukovic et al. | ................. | 378/38 |
| 2002/0191814 A1 * | 12/2002 | Ellis et al. | ..................... | 382/103 |
| 2003/0025945 A1 * | 2/2003 | Rumph et al. | ........... | 358/426.13 |
| 2004/0005089 A1 * | 1/2004 | Robles et al. | ................. | 382/141 |
| 2004/0263877 A1 | 12/2004 | McElvain | | |
| 2004/0263878 A1 * | 12/2004 | McElvain | ...................... | 358/1.9 |
| 2004/0263909 A1 | 12/2004 | McElvain | | |
| 2004/0264786 A1 | 12/2004 | McElvain | | |
| 2005/0200867 A1 * | 9/2005 | Faggion | .......................... | 358/1.9 |
| 2006/0077143 A1 * | 4/2006 | Kwon | ............................. | 345/77 |

(Continued)

*Primary Examiner* — Tsung-Yin Tsai
(74) *Attorney, Agent, or Firm* — Fay Sharpe LLP (57) ABSTRACT

Disclosed herein is a method that includes a classifier that distinguishes objects based on their color shades. A moving window based operator looks at the color class of the adjacent objects and determines if an adjustment is necessary. If at least one of the objects is the type of interest and the color classes of the objects meet the criteria, then the boundary between the objects is subject to be adjusted. Two adjustment modes are discussed: "adjust-tagging" mode and "adjust-color" mode. In the adjust-tagging mode, a specific tag is sent down to the print engine to force the use of high addressability halftones for the boundary pixels in the darker object. In the adjust-color mode, a color lighter (usually white) than that of the lighter object is assigned to the boundary pixels in the lighter object. The width of the modified pixels along the boundary is configurable.

22 Claims, 10 Drawing Sheets

(56) References Cited

U.S. PATENT DOCUMENTS

2006/0087694 A1* 4/2006 Purdum et al. ............... 358/3.2
2006/0126119 A1 6/2006 Morales et al.
2006/0257045 A1* 11/2006 McCandlish ............... 382/261
2007/0103731 A1* 5/2007 Tse et al. ............... 358/3.27
2008/0013125 A1* 1/2008 McElvain ............... 358/2.1
2008/0049238 A1* 2/2008 Nagarajan et al. ............ 358/1.9
2008/0068660 A1* 3/2008 Loce et al. ............... 358/3.06

* cited by examiner

EDGE CONTRAST ADJUSTMENT FILTER

BACKGROUND

The exemplary embodiment relates to an edge contrast adjustment filter. While it is particularly directed to the art of digital image processing, and will be thus described with specific reference thereto, it will be appreciated that the exemplary embodiment may have usefulness in other fields and applications.

By way of background, for fine text and line objects, sharpness is the single most important attribute for evaluation of image quality. To preserve the quality of edges, approaches using a tagging system enable the edge pixels of an object to use high addressability halftones when the object is surrounded by a white background. When an object overlaps the white background and a light tint background, the tagging system sometimes fails to identify the edge for the portion over the tint background, and, therefore, fails to render the edge with the high addressability halftones. This results in an inconsistent edge quality, as the text/line will appear sharp over the white and blurry over the tint background.

Figure 1:
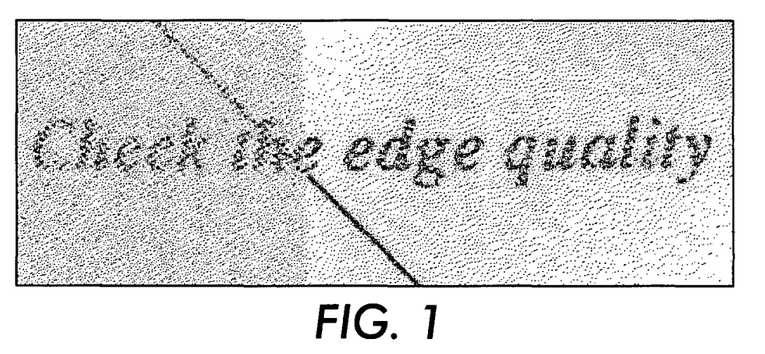
FIG. 1 is a micrograph demonstrating text/line sharpness degradation for a non-white background.

These problems have been associated with text/line objects that overlap both paper white and a light tint background. Because the outlining feature in the contone rendering module (CRM), as described in U.S. Pat. No. 6,243,499, is threshold-based, there are cases where the outlining will be disabled for the portions of these objects over the tint, resulting in sub-optimal image quality as shown in FIG. 1. Clearly, the sharpness of the text/line over the tint is severely degraded, and it would be desirable to maintain an approximately uniform object quality in these cases.

The exemplary embodiment contemplates a new and improved method and apparatus that resolve the above-referenced difficulties and others.

INCORPORATION BY REFERENCE

The following references, the disclosures of which are incorporated herein by reference in their entireties, variously relate to tagging: U.S. Pat. No. 6,243,499, "Tagging of Antialiased Images," to Loce, et al.; U.S. Pat. No. 6,167,166, "Method to Enable the Recognition and Rendering of Antialiased Images," to Loce, et al.; U.S. Pat. No. 6,144,461, "Method for Generating Rendering Tags to Facilitate the Printing of Antialiased Images," to Crean, et al.; U.S. Pat. Pub. No.

BRIEF DESCRIPTION

The exemplary embodiment involves a classifier that distinguishes objects based on their color shades. A moving window based operator looks at the color class of the adjacent objects and determines if an adjustment is necessary. If at least one of the objects is the type of interest and the color classes of the objects meet the criteria, then the boundary between the objects is subject to be adjusted. Two adjustment modes are discussed: "adjust-tagging" mode and "adjust-color" mode. In the adjust-tagging mode, a specific tag is sent down to the print engine to force the use of high addressability halftones for the boundary pixels in the darker object. In the adjust-color mode, a color lighter (usually white) than that of the lighter object is assigned to the boundary pixels in the lighter object. The width of the modified pixels along the boundary is configurable. Both these approaches mitigate the previously described rendering failure mode and result in substantially improved image quality.

In accordance with an aspect of the exemplary embodiment, An image processing method for producing objects with enhanced halftone edges is provided. The method comprises scanning a digital image having a plurality of objects to obtain scanline data; applying an edge enhancement filter to the scanline data; generating an output format that includes contone and tag/hint planes; and compressing the output format and sending the compressed output format to a printing system.

In accordance with another aspect of the exemplary embodiment, the edge enhancement filter comprises establishing a set of shade classes for objects in the digital image, determining a shade class for each object in a scanline of the digital image, wherein each object includes a plurality of boundary pixels, adding edges associated with one of the shade classes into an event list, determining whether the edges need an adjustment; and adjusting at least one parameter for the object at the boundary pixels.

In accordance with yet another aspect of the exemplary embodiment, an image processing method comprising modifying edge pixel contone values between two objects with different shade classes, wherein one is lighter and the other is darker, is provided.

In accordance with yet another aspect of the exemplary embodiment, an image processing method for a printing system with rendering tagging mechanism comprising modifying edge pixel tag values between two objects with different shade classes, wherein one is lighter and the other is darker, is provided.

DETAILED DESCRIPTION

The term "data" refers generally to physical signals that indicate or include information. An "image", i.e., a pattern of physical light, may include "image objects" in the form of characters, words, and text as well as other features such as line art, graphics, or graphical structures. An image may be divided into "segments," each of which is itself an image. A segment of an image may be of any size up to and including the whole image.

Each location in an image may be called a "pixel." Each pixel has certain pixel values associated with it. Each pixel value is a bit in a "binary form" of an image, or a gray scale value in a "gray-scale form" of an image, or a set of color space coordinates in a "color-coordinate form" of an image. The binary form, gray-scale form, and color-coordinate forms are each a two-dimensional array defining an image. Although described herein as being particularly applicable to continuous-tone processing, the exemplary embodiment applies equally as well to the processing of color images, wherein each separation is treated, effectively, as a gray-scale or continuous-tone image. Accordingly, references herein to the processing of continuous-tone (contone) or gray-scale images is intended to include the processing of color image separations as well. An operation typically performs "image processing" when it operates on an item of data that relates to part of an image.

These contone (color) pixel levels are generally continuous from one pixel to another. In some systems, however, there are additional numeric values called "tags" associated with each pixel, which may describe how the pixel is to be rendered. For example, these tags (known also as "rendering intents" or "rendering hints") may specify to the rendering stage which halftone is to be used for a printing application. In contrast to the contone (color) pixel levels, where color values are continuous, numerically adjacent tag values are in general not related. For example one pixel on the border of one object may have a tag value of 5 (150 cluster dot) associated with it. An adjacent pixel, which is associated with another type of object may have a tag value of 6 (300 line screen). The tag values of 5 and 6 are close, but the rendering hint they each refer to provide significantly different rendering outputs. If the digital image processing system produces the image in its original format, i.e., including all pixels, each pixel is rendered according to the correct tag.

Thus, the term "tag" or "hint" refers to complimentary data to be used in conjunction with the digital contone data to optimally render each pixel of a digital image. Each pixel of the contone plane is assumed to have a corresponding pixel in the tag plane.

An "image input device" is a device that can receive an image and provide an item of data defining a version of the image. A "scanner" is an image input device that receives an image by a scanning operation, such as by scanning a document. An "image output device" is a device that can receive an item of data defining an image and provide or render the image as output. A "display" is an image output device that provides the output image in human viewable form. "Halftoning" refers generally to rendering the digital image to a bit map form that can be used to drive the imaging device and includes a process that prepares the pixels for driving the imaging devices. For printing devices, the halftone image that is created is usually in a form such binary pixels, high addressability pixels, pulse width modulation codes, or some reduced quantization form that is compatible with the imaging device in the printer.

"Graphical features," "line art objects," and "text" typically refer to computer-generated features in an image as opposed to pictorial or natural scene content. The terms may also be used to describe computer-generated features that have been printed and re-digitized with a device such as an input scanner.

The term "run" refers to representation of a string of contiguous pixels whereby each of the pixels has a common attribute, such as color or tag value. The run is represented by a start position, an end position or length, and the common attribute, such as color or tag value. The term "run length encoding" is a data compression method whereby the digital signals corresponding to an image are represented as a series of contiguous runs.

Figure 2:
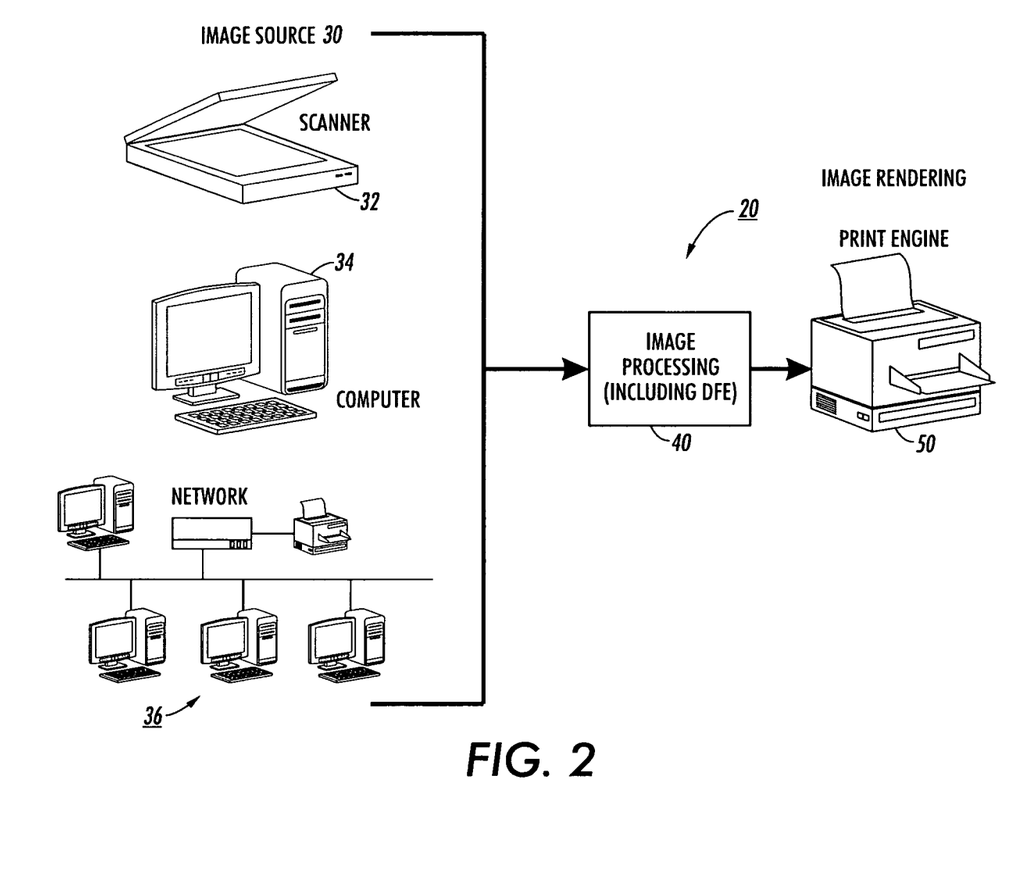
FIG. 2 is a general representation of a suitable system-level diagram for one or more aspects of the exemplary embodiment.

For a general understanding of the exemplary embodiment, reference is now made to the drawings. In the drawings, like reference numerals have been used throughout to designate identical elements. Turning now to FIG. 2, depicted therein is an embodiment of a preferred digital imaging system 20. In the system 20, an image source 30 is used to generate image data that is supplied to an image processing system 40, that may incorporate what is known in the art as a digital front end (DFE), and which produces data for rendering by print engine 50. For example, the image source 30 may include a scanner 32, a computer 34, a network 36 or any similar or equivalent image input device. On the output end, the image output device may comprise a print engine 50. The print engine 50 is preferably a xerographic engine; however, the print engine 50 may include such equivalent alternatives as ink jet, etc. The exemplary embodiment is directed towards aspects of the image processor 40 depicted in FIG. 2.

Many DFEs have the capability to recognize various objects embedded in PDL masters, for example text, stroke, and fills. These objects can then be used to optimize the processing of the contone data prior to transmission to the print engine 50. For some engines, for example Xerox Corporation's iGen3 and DC2060, it is also possible to supply rendering "hints" or "tags", for each pixel, allowing the engine to optimally render the objects on the page. For some printers, the tags are simply halftone screen specifications, and the DFE has complete control over the way each pixel is rendered. For others, there is an intermediate rendering stage, sometimes called the Contone Rendering Module (CRM).

Figure 3:
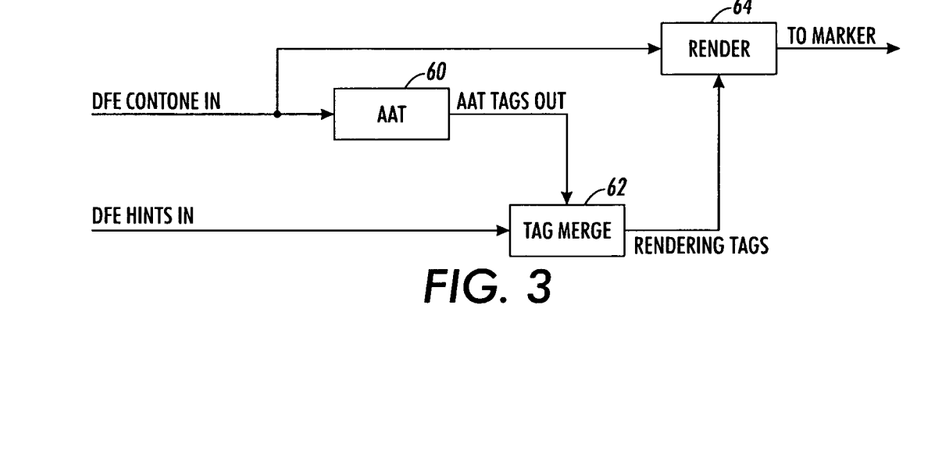
FIG. 3 is a block diagram of a contone rendering module.

A simplified block diagram of the CRM is shown in FIG. 3. For each separation, the DFE 40 provides a contone (8 bits/pixel) data plane and a hint (4 bits/pixel) data plane. The contone data is passed through the anti-aliased tagging (AAT) module 60. The data is provided to the tag merge module 62. The AAT 60 performs a pixel by pixel inspection of the contone data and creates a (4 bit) tag based on the particular geometry, object type or edge characteristics detected (it is here that edge tags are created). These AAT tags are then merged with the DFE hints in the tag merge module 62 on a per-pixel basis, producing the final set of CRM rendering tags to be used for the rendering stage 64. By virtue of the tag merge module 62, the DFE specified hints can override any outlining that would otherwise be specified by the AAT module.

For example, for fill objects, if outlining is not desirable, the specification of the DFE "fill" hint will explicitly disable the AAT outline tag. In this case, the system halftone will be used for rendering. On the other hand, for text and line art objects, the use of outlining has been found to produce superior image quality, so these AAT outline tags are allowed when the DFE "text" hint is specified.

Run length encoding is a type of lossless compression that utilizes the fact that many files frequently contain the same entity repeated many times in a row. For example, text files use multiple spaces to separate sentences, indent paragraphs, format tables and charts, etc. Digitized signals can also have runs consisting of pixels with the same value, indicating that the signal is not changing over several adjacent pixels. For example, in a data sequence having a long run of zeros, two values are written to the output file to represent that sequence. The first of these is generally the digital value of the sequence of pixels (a zero in this case). The second is the number of zeros, or in other words, the length of the run. If the average run length is longer than two, compression will take place. Many different run length encoding schemes have been developed.

Other print engines also have the capability to accept tags or hints to optimize rendering and these are generally assigned based on the object type. For these engines, a tag or hint tells the engine which rendering conditions to use for a particular object. These tags or hints are generally specified for the entire object.

Figure 4:
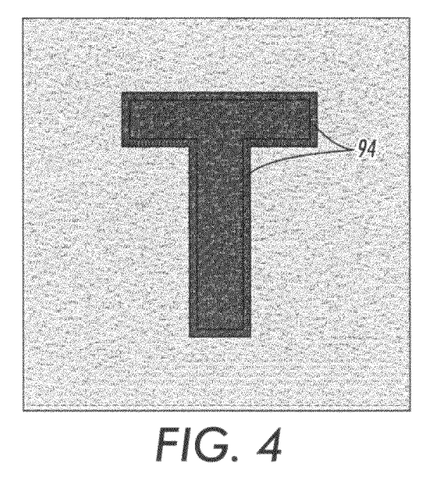
FIG. 4 illustrates the embodiment in which a single pixel frame at the midtone/highlight interface is tagged to force one of the high addressability screens.

Described below are two approaches for an edge contrast adjustment filter that addresses the above-mentioned issues and others. In the first approach, the edge enhancement filter includes modifying edge pixel tag values between two objects with different shade classes, wherein one is lighter and the other is darker. Thus, for example, edges 94 associated with "highlight" and "midtone" objects are identified or "tagged," and the tag plane is modified at this edge to force one of the CRM high addressability screens (see FIG. 4).

Figure 5:
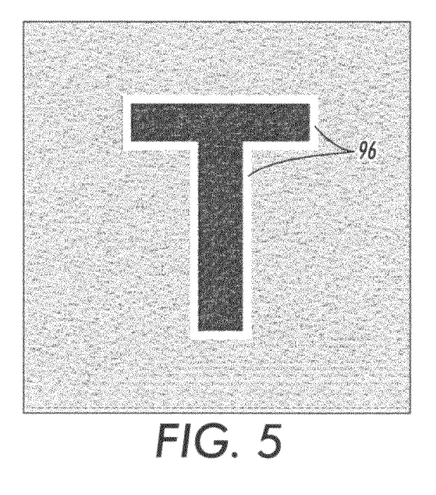
FIG. 5 illustrates the method in which a one or two pixel white frame at the midtone/highlight interface is imposed.

In the second approach, the edge enhancement filter includes modifying edge pixel contone values between two objects with different shade classes, wherein one is lighter and the other is darker. Thus, for example, edges associated with "highlight" and "midtone" objects are identified, and a white frame 96 of at least width of one pixel is placed at the interface (see FIG. 5). This "knockout" is placed entirely in the highlight portion of the interface, so as not to degrade the apparent size of the darker object. Once the image is delivered to the CRM, the AAT module 60 will tag (internally) the midtone/white interface as a "tint on white," which will subsequently result in the midtone edge pixel being rendered with one of the outline (AAR) screens.

Although these two approaches are generally intended for the DFE 40, they can also be implemented in the application that creates the document, or processes the images to be included in the document. Since the edge contrast adjustment filter is applied on the edges between objects, some level of segmentation or classification is needed so the algorithm knows which edge pixels to work on.

An exemplary image processing method involves the following steps. Initially, objects in a digital image are flattened, converted into scanline data, and stored in a buffer. Next, an edge contrast filter is applied to the scanline data. Since the edge contrast adjustment filter is scanline-based, it begins when a sufficient number of scanlines have been buffered. If it is desired to modify the pixels within a radius of n pixels from an edge, the number of the buffered scanlines will be 2n. Once the edge contrast adjustment filter has been applied, the output format that includes the contone and tag/hint planes is generated, compressed, and sent to the printer.

Figure 6:
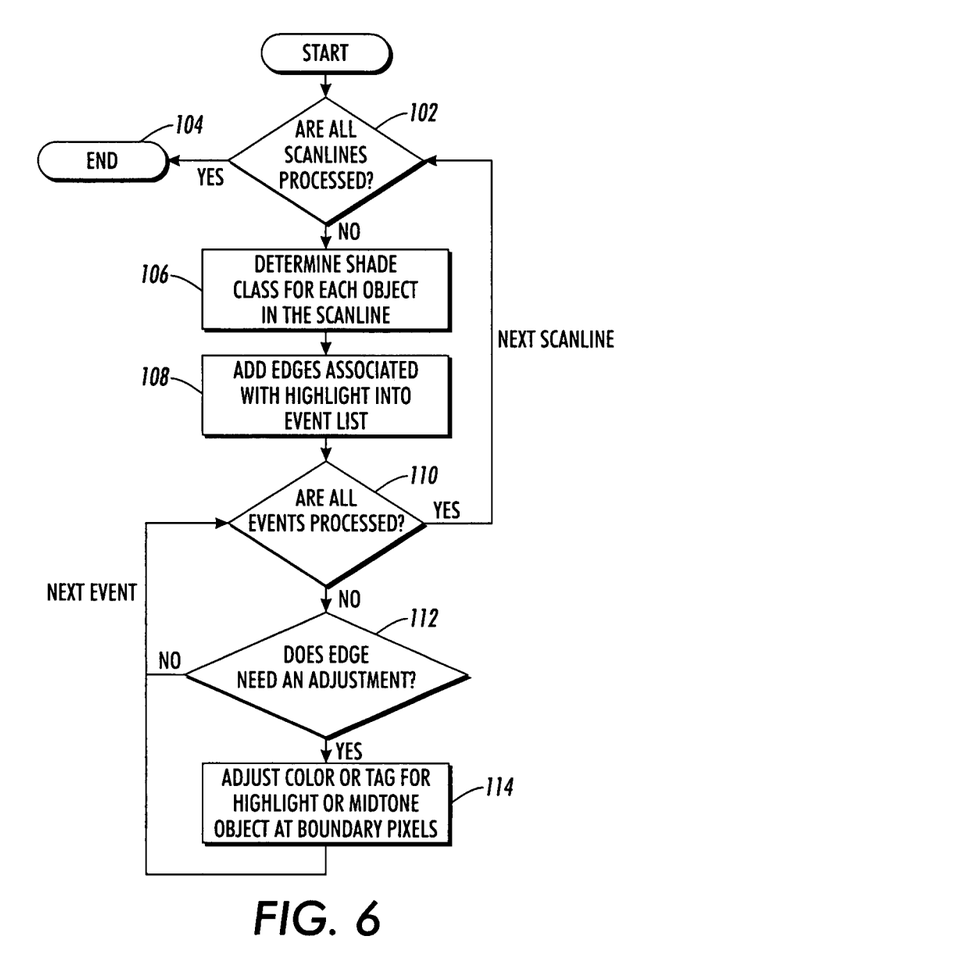
FIG. 6 is a flow diagram of an edge contrast adjustment filter method.

FIG. 6 is a flow diagram of the edge contrast adjustment filter that is to be applied to each scanline. The first step is to determine whether all of the scanlines in the page have been processed (102). If so, then the algorithm ends (104). Otherwise, the next step is to classify the objects in the given scanline into different shade types (106). By way of example, there may be four different shade types defined to describe a particular separation: WHITE, HIGHLIGHT, MIDTONE_AND_ABOVE, and OTHER. The shade type is determined based on the contone value of the run. Although, it is possible to extend the number of shade types based on the response of the particular printing device. For example, the HIGHLIGHT shade type could be broken into two distinct types, one which would require a one pixel knockout, and the other a two pixel knockout. Furthermore, the shade types could themselves be a function of the halftone used to render the local group of pixels—higher frequency halftones may require a greater amount of knockout in some cases.

In the simple example of four shade categories, for each separation, the shade class may be defined as:

if $0 \leq$ digital count $\leq$ white threshold, this separation is said to be WHITE;

if white threshold $<$ digital count $\leq$ highlight threshold, this separation is said to be HIGHLIGHT;

if highlight threshold $<$ digital count $\leq$ midtone threshold, this separation is said to be OTHER;

if midtone threshold $<$ digital count $\leq 255$, this separation is said to be MIDTONE_AND_ABOVE.

The shade class of a multi-channel color space (e.g., CMYK or RGB) is determined by the shade class types of its separations:

if the darkest separation is HIGHLIGHT and at least one separation is HIGHLIGHT, the color is said to be HIGHLIGHT;

else if at least one separation is MIDTONE, the color is said to be MIDTONE;

else if all separations are WHITE, the color is said to be WHITE;

else the color is said to be OTHER.

In this regard, the multi-channel space is N-channel, where N is greater than or equal to zero.

Once the shade classes are determined, add edges associated with some shade types (i.e., HIGHLIGHT) to the event list (108). An event list can be implemented as a link list; each event in the event list contains pointers to the previous event and the next event, and carries the pixel location of the event on the current scanline. Since we are only interested in the edges that transition from HIGHLIGHT to MIDTONE or MIDTONE to HIGHLIGHT in this example, adding edges of HIGHLIGHT runs and examining if these edges are adjacent to a MIDTONE run is sufficient. Equivalently, one can also add edges associated with MIDTONE runs, and examine if those edges are adjacent to a HIGHLIGHT run. All other run transition types are excluded from the event list, which can substantially improve the processing speed for this method. The shade classes to be added in the event list comprise a subset of all possible shade classes.

Next, determine whether all events (e.g., edges) have been processed (110). If so, then return to step 102. Otherwise, look at the HIGHLIGHT-MIDTONE transitions between the objects and determine whether the edge needs an adjustment (112). If not, then return to step 110. Otherwise, adjust the color for the HIGHLIGHT object at the boundary pixels if the "adjust-color" mode is enabled, and/or the tag for the MIDTONE object at the boundary pixels if the "adjust-tagging" mode is enabled. WHITE-MIDTONE edges may be processed in the printer hardware (CRM), which detects the WHITE-MIDTONE edges and applies high addressable halftones to the boundary pixels for the MIDTONE object. If the hardware does not have this capability, the algorithm can be easily expanded to cover the WHITE-MIDTONE edges as well. In this case, adding MIDTONE edges to the event list is preferable. Consequently, instead of only looking at the HIGHLIGHT-MIDTONE interfaces, the algorithm also needs to look at WHITE-MIDTONE interfaces, and applies appropriate tags. The WHITE-HIGHLIGHT edges are not of interest, since the high addressable halftones do not apply to highlight pixels.

When examining HIGHLIGHT-MIDTONE edges, in practice, the yellow separation can be ignored, since its existence can lead to an incorrect classification due to its low visibility relative to paper white. For example, consider CMYK counts of one object (130,0,20,0), and (20,0,130,0) for the other. If Y separation were taken into account for the classification, both objects would be of class MIDTONE. Since there would be no HIGHLIGHT-MIDTONE transition at this edge boundary, there would be no adjustment done between two objects. As a result, the Cyan boundary will be rendered with one of the native halftones instead of the high addressability halftones. Whether or not one is rendering the yellow boundary with the high addressability screens should not sufficiently impact overall edge quality (due to the low visibility of Y), but for other separations it would. An alternative way for the adjustment is to process each separation independently. However, the performance would be possibly degraded due to the extra computation required for separation-based processing.

Edges associated with some (e.g., HIGHLIGHT) objects are added to the event list, where the event list contains only run boundaries that are "interesting." This allows the algorithm to proceed in an accelerated fashion, skipping over the runs/scanlines where processing is not required. The algorithm processes the interfaces in the event list until all edges are processed in the current scanline. It then moves on to the next scanline until all scanlines are processed. The examination of the edges in the event list is object oriented, meaning we only process the objects with types (for example, text and strokes) that we are interested in. If a HIGHLIGHT object is adjacent to a MIDTONE object, and the object type is of interest, this edge is subject to be adjusted.

Figure 7:
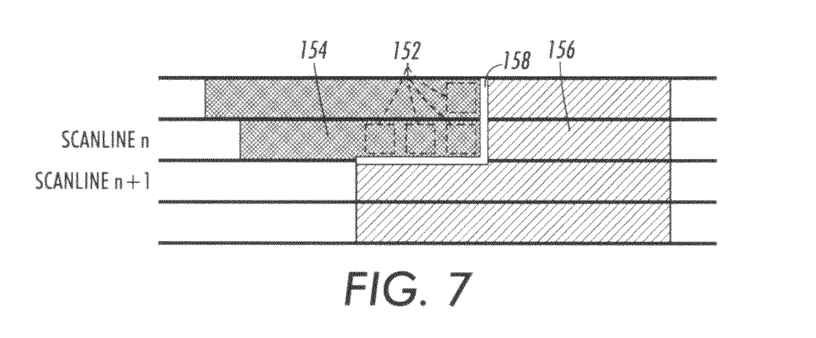
FIG. 7 illustrates the adjust-tagging mode of the edge contrast adjustment filter.

When the adjust-tagging mode is enabled, assign the high addressable halftone tags to the edge pixels 152 for the MIDTONE_AND_ABOVE object 154, and leave the HIGHLIGHT object 156 unchanged for the scanline, as shown in FIG. 7. An edge associated with the HIGHLIGHT object 156 is represented by reference numeral 158.

Figure 8:
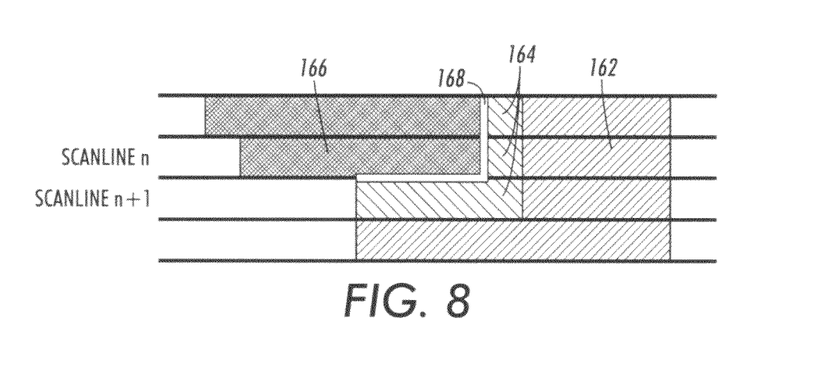
FIG. 8 illustrates the adjust-color mode of the edge contrast adjustment filter.

When the adjust-color mode is enabled, assign a color that is lighter than that of the HIGHLIGHT object 162 to the edge pixels 164 for the HIGHLIGHT object 162 for the scanline, as shown in FIG. 8. The MIDTONE_AND_ABOVE object is represented by reference numeral 166, while an edge associated with the HIGHLIGHT object 156 is represented by reference numeral 168. Thus, the modification occurs at the edge pixels with a configurable radius in the lighter object. Note that adjust-tagging mode and adjust-color mode can be enabled at the same time.

Once the edge contrast adjustment filter has been applied, the output format that includes the contone and tag/hint planes is generated, compressed, and sent to the printer. On the printer, the output format from the DFE 40 is then decompressed, and contone and tag/hint data is then processed through the CRM illustrated in FIG. 3. Finally, the contone data is rendered or halftoned based on the rendering tags, which is the output of the tag merge table.

Figure 9:
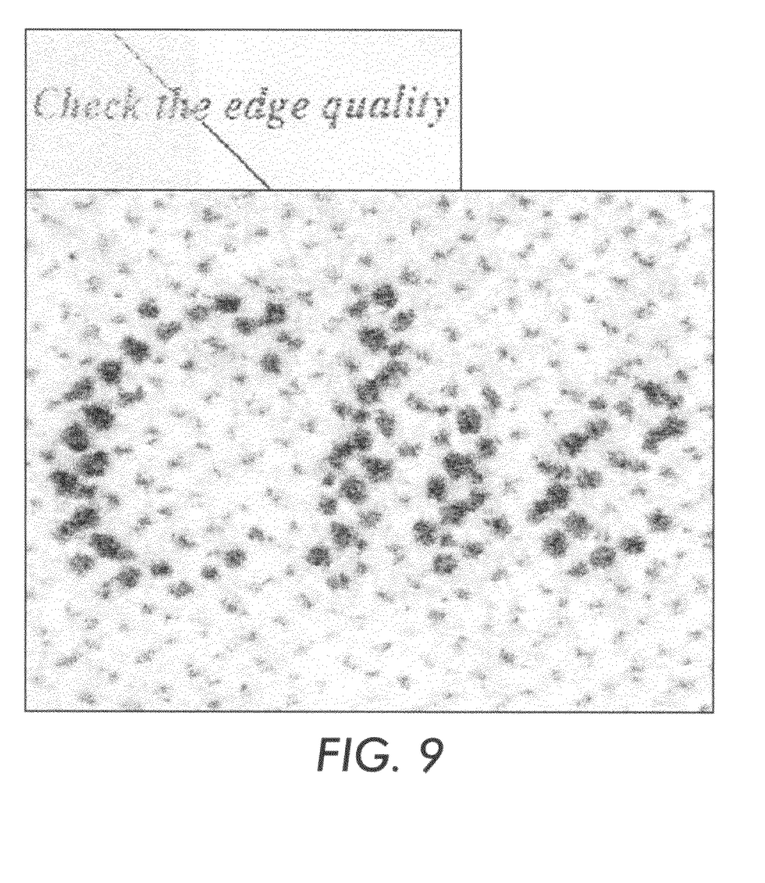
FIG. 9 is a magnified print sample before implementation of the exemplary embodiment.
Figure 10:
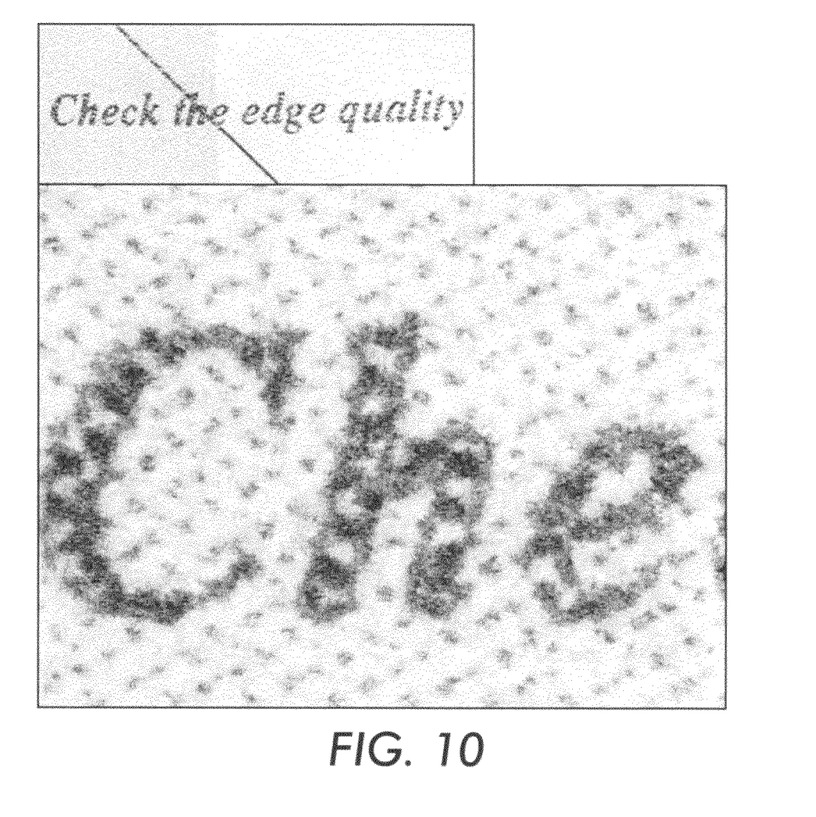
FIG. 10 is a magnified print sample when the first embodiment of the method (adjust-tagging) is applied.
Figure 11:
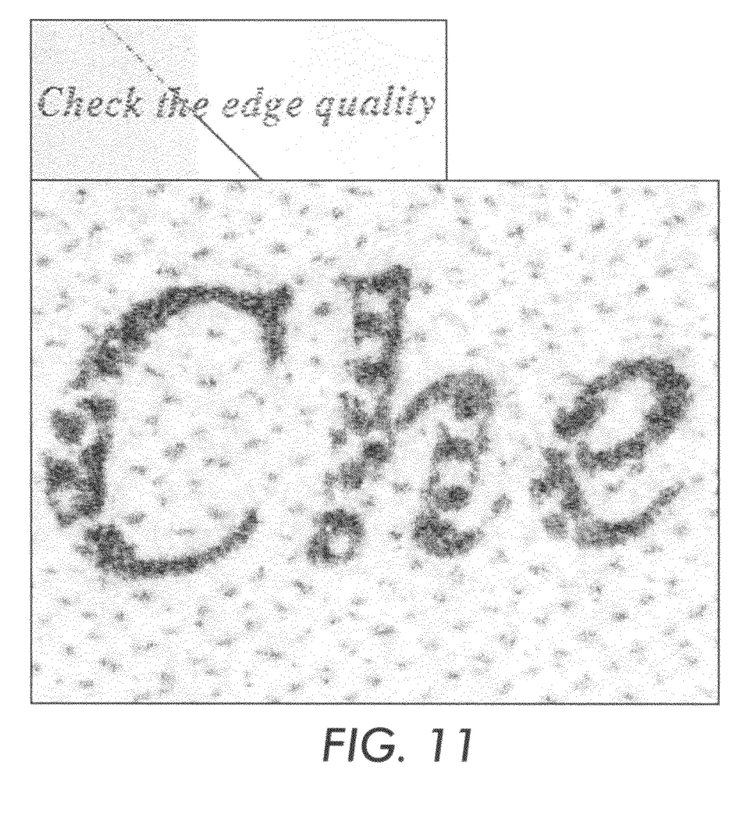
FIG. 11 is a magnified print sample when the second embodiment of the method (adjust-color) is applied, whereby a white frame is forced at the interface with an adjustment radius of 1 pixel.
Figure 12:
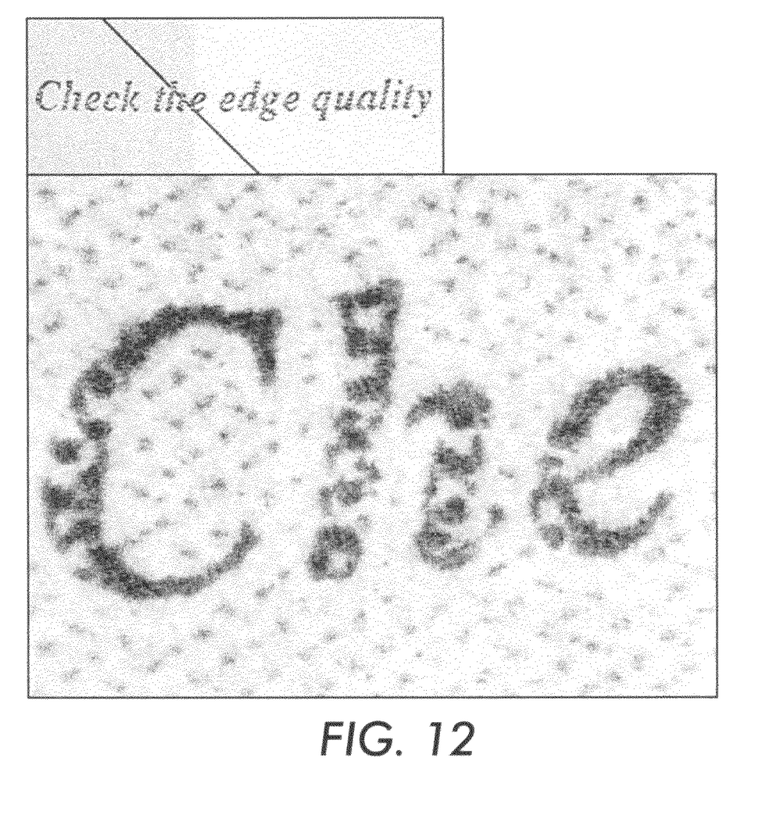
FIG. 12 is a magnified print sample when the second embodiment of the method (adjust-color) is applied, whereby a white frame is forced at the interface with an adjustment radius of 2 pixels.

Both approaches result in substantial improvements in the image quality in these cases, as shown in the micrographs of FIGS. 9-12. FIG. 9 shows magnified print sample without applying the proposed algorithm. FIG. 10-12 show the same areas when applying the adjust-tagging approach (FIG. 10) and the adjust-color approach with a radius equal to 1 (FIG. 11) and a radius equal to 2 (FIG. 12). One can see that the exemplary embodiment produces a consistently superb edge quality when the background shades are different. Notice that the text appears to be slightly thickened in FIG. 10. This is due to the interaction between the halftone dots in the "highlight" object, and the high addressable dots in the "midtone" object. This artifact can be improved if both embodiments of the method are applied.

In FIG. 11, the diagonal line appears to be broken. This is due to the inappropriate processing for the 450 thin lines by the CRM and can be improved if the adjust-tagging mode is also enabled. One can see that the edge quality of the text is improved when only the adjust-color mode is enabled. In addition, the text maintains the same thickness across different background shades.

Some portions of the above description were presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to systems for performing the operations herein. These systems may be specially constructed for the required purposes, or they may comprise one or more general-purpose computers selectively activated or reconfigured by one or more computer programs stored in the computer(s). Such computer program(s) may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description. In addition, the present exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An image processing method for producing objects with enhanced halftone edges, the method comprising:
    scanning with a scanner a digital image having a plurality of objects to obtain scanline data;
    applying by an image processor an edge enhancement filter to the scanline data, including:
        classifying each object into a set of shade classes,
        adding objects tagged as being associated with a first shade class to an event list, and
        adjusting a parameter if the added object is adjacent to an object classified in a second shade class;
    generating an output format that includes contone and tag/hint planes; and
    compressing the output format and sending the compressed output format to a printing system.

2. The method of claim 1, wherein the parameter to be adjusted is color.

3. The method of claim 1, wherein the parameter to be adjusted is a tag.

4. The method of claim 1, wherein the parameters to be adjusted are color and a tag.

5. The method of claim 1, wherein the shade classes for each separation comprise WHITE, HIGHLIGHT, MIDTONE_AND_ABOVE, and OTHER.

6. The method of claim 5, wherein for each separation the shade class may be defined as:
    if 0≤digital count≤white threshold, this separation is said to be WHITE;
    if white threshold<digital count≤highlight threshold, this separation is said to be HIGHLIGHT;
    if highlight threshold<digital count≤midtone threshold, this separation is said to be OTHER;
    if midtone threshold<digital count≤255, this separation is said to be MIDTONE_AND_ABOVE.

7. The method of claim 1, wherein the shade classes to be added in the event list are a subset of all possible shade classes.

8. The method of claim 7, wherein the shade class of a multi-channel color space is determined by the shade class types of its separations:
    if the darkest separation is HIGHLIGHT and at least one separation is HIGHLIGHT, the color is said to be HIGHLIGHT;
    else if at least one separation is MIDTONE, the color is said to be MIDTONE;
    else if all separations are WHITE, the color is said to be WHITE;
    else the color is said to be OTHER.

9. The method of claim 8, wherein the multi-channel color space is CMYK or RGB.

10. The method of claim 9, further comprising a mechanism to ignore the edges that have transition between HIGHLIGHT and MIDTONE_AND_ABOVE for a lighter color separation.

11. The method of claim 10, wherein the lighter color separation is a Yellow.

12. The method of claim 8, wherein the multi-channel color space is N-channel, where N is greater than or equal to zero.

13. An edge enhancement filtering method comprising:
    applying by an image processor an edge enhancement filter to scanline data of a digital image, including:
        classifying each object into a set of shade classes;
        identifying edge pixels associated with adjacent objects that transition between a first shade class and a second shade class;
        determining whether the edge pixels need adjustment between the transitions;
        tagging the edge pixels to include at least one pixel width of a different color at an interface of an object portion of the transitions;
    generating an output format that includes contone and tag/hint planes; and, compressing the output format and sending the compressed output format to a printing system.

14. The method of claim 13, wherein the two different shade classes are HIGHLIGHT and MIDTONE.

15. The method of claim 13, the modification occurs at the edge pixels with a configurable radius in the lighter object.

16. The method of claim 15, wherein the newly modified color is even lighter than that of the lighter object.

17. The method of claim 16, wherein the lighter color is WHITE.

18. The method of claim 13, wherein the modification occurs at the edge pixels in the darker object.

19. An edge enhancement filtering method for a printing system with a rendering tagging mechanism comprising:
    applying by an image processor an edge enhancement filter to the scanline data, including:
        classifying each object into a set of shade classes,
        adding objects tagged as being associated with a first shade class to an event list, and
        adjusting a parameter if the added object is adjacent to an object classified in a second shade class, wherein the adjustment includes modifying a tag plane to force a high addressability screen;
    generating an output format that includes contone and tag/hint planes; and
    compressing the output format and sending the compressed output format to a printing system.

20. The method of claim 19, wherein the modification occurs at the edge pixels in the darker object.

21. The method of claim 20, a newly modified tag utilizes the high addressable halftones.

22. An image processing method for producing objects with enhanced halftone edges, the method comprising:
    scanning a digital image having a plurality of objects to obtain scanline data;
    applying an edge enhancement filter to the scanline data, including:
        classifying each object into a set of shade classes,
        modifying an edge pixel or contone value between two objects of different shade classes,
        identifying and tagging edges associated with certain shade types, adding edges associated with a first shade,
examining whether the edge needs adjustment between highlight-midtone transitions,
adjusting the parameter at the boundary pixel if a select mode is enabled, and
placing at least one pixel width of white frame at an interface of a highlight portion;
generating an output format that includes contone and tag/hint planes; and,
compressing the output format and sending the compressed output format to a printing system.

* * * * *